United States Patent
Ebner

(10) Patent No.: US 6,429,950 B1
(45) Date of Patent: Aug. 6, 2002

(54) METHOD AND APPARATUS FOR APPLYING OBJECT CHARACTERIZATION PIXEL TAGS TO IMAGE DATA IN A DIGITAL IMAGING DEVICE

(75) Inventor: Fritz F. Ebner, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/224,322

(22) Filed: Dec. 31, 1998

(51) Int. Cl.$^7$ .................................................. G06K 9/34
(52) U.S. Cl. ...................... 358/1.9; 358/1.16; 358/1.18; 382/173; 382/180
(58) Field of Search .................................. 358/1.9, 1.15, 358/1.16, 1.17, 1.18; 382/173, 176, 180

(56) References Cited

U.S. PATENT DOCUMENTS

| | | | | |
|---|---|---|---|---|
| 5,644,406 A | * | 7/1997 | Harrington et al. .......... | 358/433 |
| 5,754,746 A | * | 5/1998 | Blurfrushan et al. ......... | 395/114 |
| 5,778,160 A | * | 7/1998 | Smith .......................... | 358/1.9 |
| 5,978,522 A | * | 11/1999 | Ishii et al. ................... | 382/299 |

OTHER PUBLICATIONS

PostScript Language Reference Manual, (Second Edition), Addison Wesley Pub., pp. 307, 308, 309, and 499.

* cited by examiner

Primary Examiner—Thomas D. Lee
(74) Attorney, Agent, or Firm—Fay, Sharpe, Fagan, Minnich & McKee, LLP

(57) ABSTRACT

A method and apparatus uses simple interpretive programming language commands to generate and register object characterization information in the form of tags appended to a plurality of pixel display values stored in the frame buffer of a digital imaging device. The page description language commands are used to generate and register the tag information on a per-pixel level in the frame buffer based on the object type of imaging data derived from the page description language data received into the imaging device. The pixel data image tagging is useful to differentiate between bit maps, text, line art, and fill art in gray scale, RGB, CMYK, and other color space frame buffers to enable per-pixel segmentation tags. In one aspect of the invention, an auxiliary color transfer function is provided together with an auxiliary frame buffer channel that are respectively adapted to generate and store tag bits or image object tags without effecting the standard RGB, CMYK or other color transformation functions and/or digital frame buffer image color storage planes. Preferably, PostScript programming language commands are used to set the yellow color transfer function to render image data with predetermined LSB bit patterns.

17 Claims, 5 Drawing Sheets

METHOD AND APPARATUS FOR APPLYING OBJECT CHARACTERIZATION PIXEL TAGS TO IMAGE DATA IN A DIGITAL IMAGING DEVICE

FIELD OF THE INVENTION

The present invention relates to the art of processing and rendering image data in digital color printing and reproduction systems and in digital display systems. More specifically, the present invention relates to processing image data by applying pixel tags to the image data stored in an imaging device frame buffer based on imaging operator type classifications or based on other operator parameters using simple interpretive programming language commands.

BACKGROUND OF THE INVENTION

Computer-based imaging systems have become popular for producing both electronic and hard copy images due in part to the proliferation and availability of desktop publishing programs. In such systems, a host computer typically generates data that describes the image and then transfers the data to an image-generating device where it is converted into a format that can be used by the device. One common form of document representation is a page description language (PDL), such as, for example, PostScript available from Adobe. Nearly all page description languages include a set of interpretive programming language commands that enable document manipulation.

Page description language, i.e., PostScript, compatible desktop publishing and other image producing application programs generate graphic commands which are converted into interpretive page description language commands. Imaging device hardware and software interprets the page description language commands so that the proper type and sequence of graphics operations can be performed to generate the images created in the desktop publishing program. Typical graphics operations executed by the imaging device include text, graphics, and pictorial (bitmap) operations. The commands for these operations are called "paint operators" and are embedded in the page description language.

For each paint operation, the interpretation process in the imaging device typically also includes a step of determining the proper set of graphic state arguments, such as color, current transformation matrix, and the like, that are to be applied to the operand of each paint operator. Using this information, pixel display values are created and stored in a frame buffer to represent the colors and shapes of the paint operands. A print engine in the imaging device forms the image based on the pixel display values stored in the frame buffer. The process within the imaging device of converting the image data received from the host computer into the pixel display values arranged in the frame buffer for ready use by a print engine or display hardware is commonly known in the art as "rendering" an image.

Within the above framework, it is well known in the digital imaging art to use a single collection of parameters to control the production of text, images, and graphics on a raster output device. The collection of parameters in the PostScript page description environment is called the "Current Graphics State." For convenience in connection with describing the present invention, the expression "current graphics state" will be used to describe a data structure holding parameters used to define the global framework in which the graphics operators execute. Other PostScript type expressions will be used as well. It is not meant, however, to imply that the invention is limited to the PostScript environment or that the present invention is in any way limited in application to PostScript machines.

In practice, the imager continuously references the current graphics state parameter set to render images based on the information generated by the page description language interpreter as it executes normal sources of program text, such as, for example, standard PostScript input files. The page description language interpreter is sometimes located in the host computer but is typically embedded in the printer or display device. When the imaging operators used to render the image on a page or screen are of homogenous object type, i.e., all graphics object types, all text object types, or all image (bitmap) object types, there is no need to modify the contents of the current graphics state during image rendering thereby realizing efficient image data processing. However, current sophisticated desktop publishing systems allow the user to combine different types of image objects into a single composite document. For example, a user can combine photographic images, text, and business graphics such as charts into a single document wherein these images may be either color, black/white, or contain components of both as well.

To achieve satisfactory results, each of these objects needs to be processed differently so that a high quality document can be produced. More particularly with regard to the imaging device, the parameters contained in the current graphics state must be adjusted each time there is a change between image object types so that the proper pixel display values are arranged in the frame buffer. In that way, photographic objects can be processed using a first set of current graphics state parameters, while business graphics, text, etc. may be processed another way using different sets of current graphics state parameters.

To resolve this problem, object oriented rendering systems have been developed. In these systems, the objects which make up a composite document are rendered (processed) uniquely. In certain imaging systems, such as, for example, the Xerox Intelligent Color System, object oriented imaging is implemented by PostScript operator overloading. In operator overloading, the particular imaging operators, such as, for example, show (text), fill or stroke (graphics), and image (pictorial) are overloaded or overwritten so that if the parameters contained in the present current graphics state are incorrect or inappropriate for rendering certain objects, they are modified before executing the actual painting operator.

Although the above-described operator overloading technique uniquely renders each object making up a composite document to achieve satisfactory image quality results, the time required to switch the parameters in the current graphics state and, in addition, the time required for operator overloading results in a significant negative performance impact. This is especially true when text and graphics are handled differently in the imaging device. Further, the negative performance impact becomes more pronounced when a composite document contains a significant amount of mixed text and graphics objects.

Several schemes have been proposed for assisting print engines to more faithfully and accurately render multiple object type images. One such scheme associates tag information with the pixel display values stored in the frame buffer. The tag information classifies portions of the image according to object type so that the print engine can print or display the image using specialized hardware, firmware, or the like tuned to react to the tag information.

Although pixel tagging schemes have met with some success, they are typically difficult to implement and awkward to use. Hardware pixel tagging schemes are usually overly print engine dependent and software methods are not always compatible with the native page description language commands used by the print engine.

Accordingly, there is a need for a method and apparatus for applying pixel tags to image data in a digital imaging device using simple generic interpretive programming language commands that are compatible with nearly all page description languages that are presently available.

SUMMARY OF THE INVENTION

In accordance with the present invention, a method and apparatus are provided for registering object characterization information in the form of tags appended to the plurality of pixel display values stored in the frame buffer of an imaging device using simple interpretive programming language commands such as simple page description language commands. The invention registers the tag information in the frame buffer based on the object type of the imaging data derived from the page description language data received into the imaging device. The pixel data image tagging is useful to differentiate between bit maps, text, line art and fill art in gray scale, RGB, and CMYK frame buffers to enable per-pixel segmentation tags.

In accordance with another aspect of the present invention, an auxiliary color transformation function is provided, together with an auxiliary frame buffer channel or plane, so that pixel tags can be developed by the auxiliary color transfer function and written directly into the auxiliary buffer channel or plane without affecting the standard color planes.

In each of the above aspects of the present invention, the pixel tags are directly available to the print engine hardware or firmware in digital printing or reproduction systems that are adapted to perform special rendering operations based upon the tag information.

One advantage of the present invention is that the information regarding the object types of the image data is not lost during the translation into the frame buffer digital representation of the image. Accordingly, that information can be used downstream in the printing process to directly control the operation of the active elements in the print engine, such as, for example, a laser diode in a laser printer, or a printhead in an ink jet printer, or the like, to form the image.

Another advantage of the present invention is that the task of segmenting objects is simplified because the tag information regarding the object type classification is immediately available and recognizable in the digital representation of the image contained in the frame buffer.

Still other advantages and benefits of the invention will become apparent to those skilled in the art upon a reading and understanding of the following detailed description.

BRIEF DESCRIPTION OF THE DRAWING

The invention may take form in certain parts and in certain steps and arrangements of steps, the preferred embodiments of which will be described in detail in this specification and illustrated in the accompanying drawings, which form a part herein and wherein.

DETAILED DESCRIPTION OF THE PREFERRED EMBODIMENTS

Figure 1:
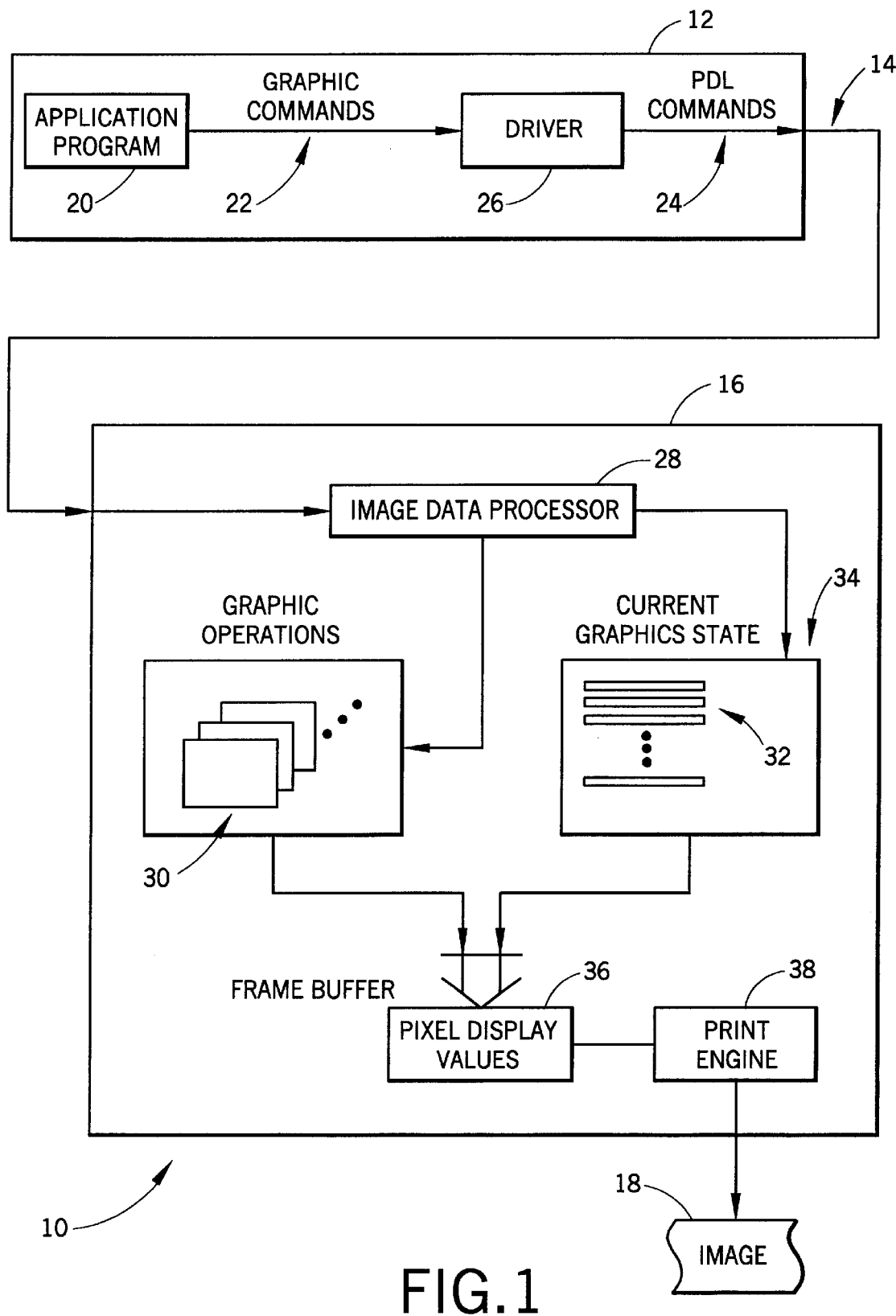
FIG. 1 is a block diagram showing a conventional computer-based imaging system capable of object oriented rendering using operator overloading.

Referring now to the drawings wherein the showings are for the purposes of illustrating the preferred embodiments of the invention only and not for purposes of limiting same, FIG. 1 shows the typical flow of data in a conventional computer-based imaging system 10 capable of object oriented rendering using operator overloading. The imaging system includes a host computer 12 communicating image data 14 to an image generation device 16 to generate an image 18. An application program 20, such as, a desktop publishing program, generates a set of graphic commands 22 that are converted into page description language commands (PDL) 24 by a driver software program 26. In one popular scheme, the driver program 26 generates page description language commands in the form of a PostScript language program.

The image data 14 in the form of PDL commands is routed to the image generation device 16, using any suitable communication media such as, for example, twisted pair or fiber optic hardware. An image data processor 28 in the image generation device interprets the page description language commands to thereby determine which type of graphics operations 30 are to be performed, such as draw a rectangle or paint a particular character of text. In addition, the image data processor performs the necessary calculations to insure that the appropriate set of arguments 32 are lodged in the current graphics state so that the appropriate graphic state arguments, such as, for example, color, font, size, and the like are applied to each object. This information is converted into pixel display values in a frame buffer 36 for the control of a print engine 38 to generate the image 18.

In the prior art computer-based imaging system illustrated in FIG. 1, it is necessary that the arguments in the current graphics state are reloaded each time a different image object is encountered in the image data stream 14. The result is a decrease in speed of the system and a commensurate loss of efficient utilization of the image generation device and of the host computer as well.

Figure 2:
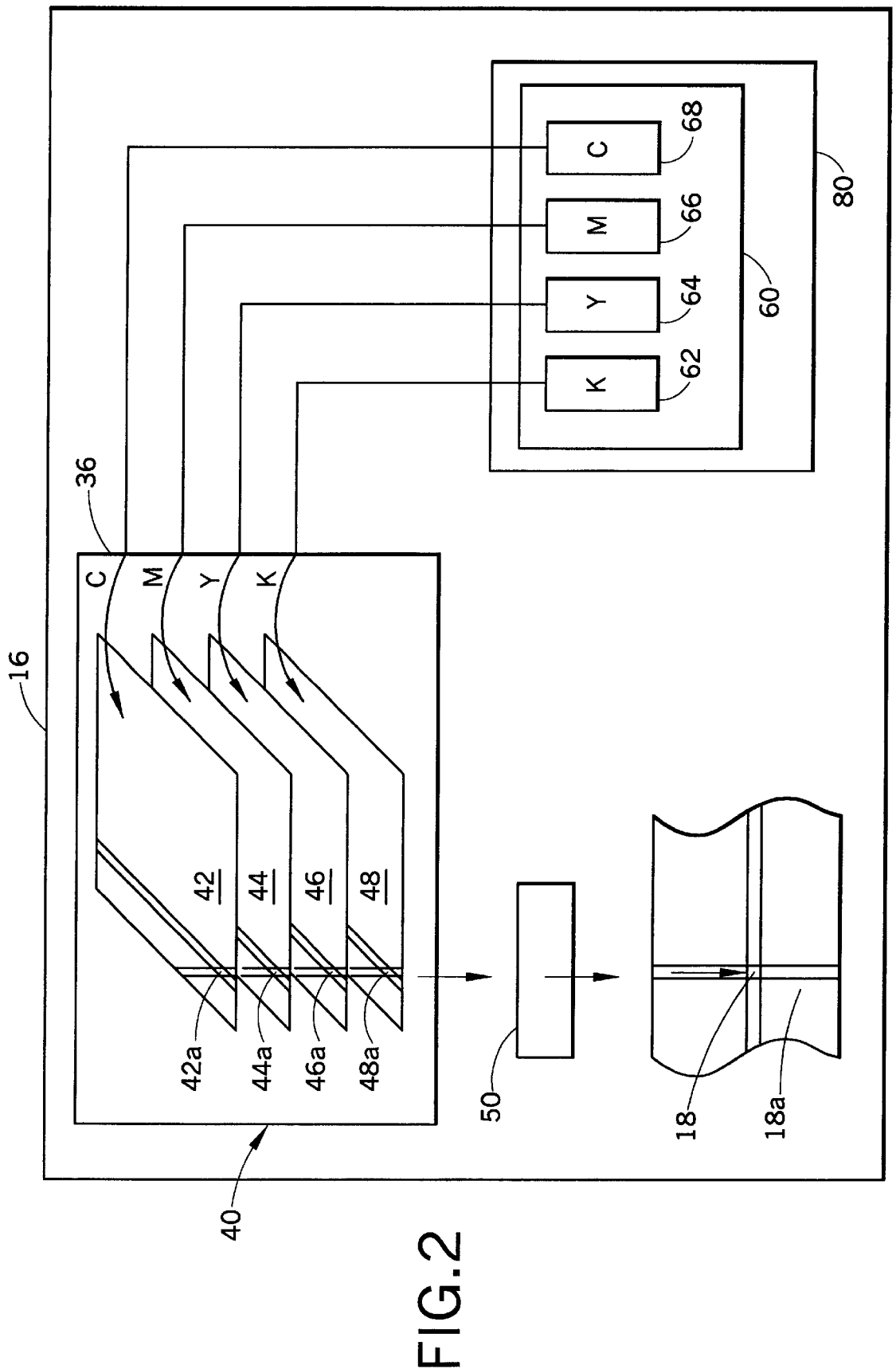
FIG. 2 is a block diagram illustrating a first preferred embodiment of the present invention wherein the least significant lower pair of bits in the yellow data channel or plane of the gray scale frame buffer channel are used as the tag bits.

With reference next to FIG. 2, the first preferred embodiment of the present invention will be described. In this embodiment, standard page description language command operators are used to unconditionally set or clear one or more bits in one of the byte planes of the frame buffer to a predetermined level of logic 1 or logic 0. As shown, the gray scale frame buffer 36 includes four color planes 40. The color planes 40 are illustrated in a stacked relationship for ease of understanding and include a cyan byte plane 42, a magenta byte plane 44, a yellow byte plane 46, and a black byte plane 48. Each of the byte planes contain a digital representation in the form of pixels of what is to be printed by the raster output device 50 onto a printed page 18. The raster output device is, as on example, a laser development system of a laser color printer or copier.

As is well-known in the art, the plurality of pixel display values contained in the byte planes 40 are combined in a fashion to form a plurality of digital pixel image representations that are used to control the print engine to generate an image on a document 18. As an example, FIG. 2 illustrates a first cyan pixel data value 42*a* that is combined with a magenta pixel data value 44*a*, a yellow pixel value 46*a*, and a black pixel value 48*a*. Each of the pixel values in the frame buffer are preferably an 8-bit representation of the respective color component of the overall image. The pixel values are generated by a series of rendering steps well known in the art. The last step in the series involves the use of a color transform matrix 60 that includes a set of transfer function procedures 62–68 one per color plane, respectively. In the CMYK color space, the color transformation matrix includes a cyan color transfer function procedure 62, a magenta color transfer function 64, a yellow color transfer function 66, and a black color transfer function 68. Each of the individual color transfer functions 62–68 are provided in the current graphics state 70 in the image generation device 16. Although the CMYK color space is described as the preferred example, the invention is equally applicable to other color spaces as well such as, for example, the RGB color space.

In accordance with the first preferred embodiment of the invention, for each image object, the least significant bit in the yellow byte plane 44 of the frame buffer 36 is used to indicate the object type of the pixel image data. This allows differentiation between two (2) image object types. As a preferred example, the least significant bit in the yellow channel 46 is used to differentiate between bitmap image object types and all other image object types.

Preferably, the yellow color transfer function procedure 64 is used to set the least significant bits of the yellow byte plane pixel display values to reflect the object type of the image data, rather than bits in any of the other color planes 42, 46, and 48. This is because in general yellow is least affected among the colors by the reduction in scale range caused by the loss of the least significant bit due to the allocation of the bit to the tag data.

In that regard, in accordance with the instant invention, the following simple interpretive programming language transfer function, written in the PostScript page description language by way of preferred example, is used to set the yellow transfer function 64 within the color transform matrix 60 of the current graphics state 70 so that the least significant bit in the yellow byte plane 46 will be set to a "0" to tag image objects that are of a first (e.g. graphic) image object type:

{}{}{255.0 mul cvi 254 and cvr 255.0 div}{}setcolortransfer  (1)

In a similar fashion, in accordance with the present invention, the following line of PostScript page description language code is used to set the yellow transfer function 64 within the color transform matrix 60 of the current graphics state 70 so that the least significant bit in the yellow byte plane 46 will be set to a "1" to tag image objects that are of a second non-graphic (e.g. bit map) type:

{}{}{255.0 mul cvi 01 or cvr 255.0 div}{}setcolortransfer  (2)

The above code sections are written in the PostScript language by way of preferred example only. The present invention is equally amenable to other page description languages as well, especially those that have sufficient control over the job stream to force bits to select values in the color planes when paint operators are executed or rendered.

In general, the "setcolortransfer" operator in the PostScript example page description language sets the color transfer function to behave in a range of programmable fashions during the rendering of objects. Each invocation of the "setcolortransfer" operator alters the current graphics state according to the parameters passed to the operator. Preferably, in accordance with the first embodiment of the invention, each invocation of the setcolortransfer operators, (1) or (2) above, sets the yellow color transfer function 64 to behave in a manner that any subsequently rendered paint operators will result in a "0" or "1" value, respectively, to be written as the least significant bit in portions of the yellow plane of the frame buffer bounded by the paint operator image object. This process is known as overloading the graphics operators. In accordance with the present invention, at least one of the transfer functions 62–68 are selectively changed every time a paint operator corresponding to the type of art (i.e. graphic or non-graphic) to be rendered is executed. Preferably, the yellow color transfer function procedure is used exclusively.

After the above lines of code are executed to appropriately set the yellow color transfer function so that the least significant bits of the selected pixels will be forced to either a "0" or a "1", the appropriate graphics operator is executed, such as, for example, the "fill" operator. The fill operator renders the image object using the current graphics state as modified by the "setcolortransfer" operator. In that way, the least significant bits of the yellow byte plane 44 of the gray scale frame buffer corresponding to the image object are set to the appropriate tag value corresponding to the object type of the image data to be rendered.

Figure 3:
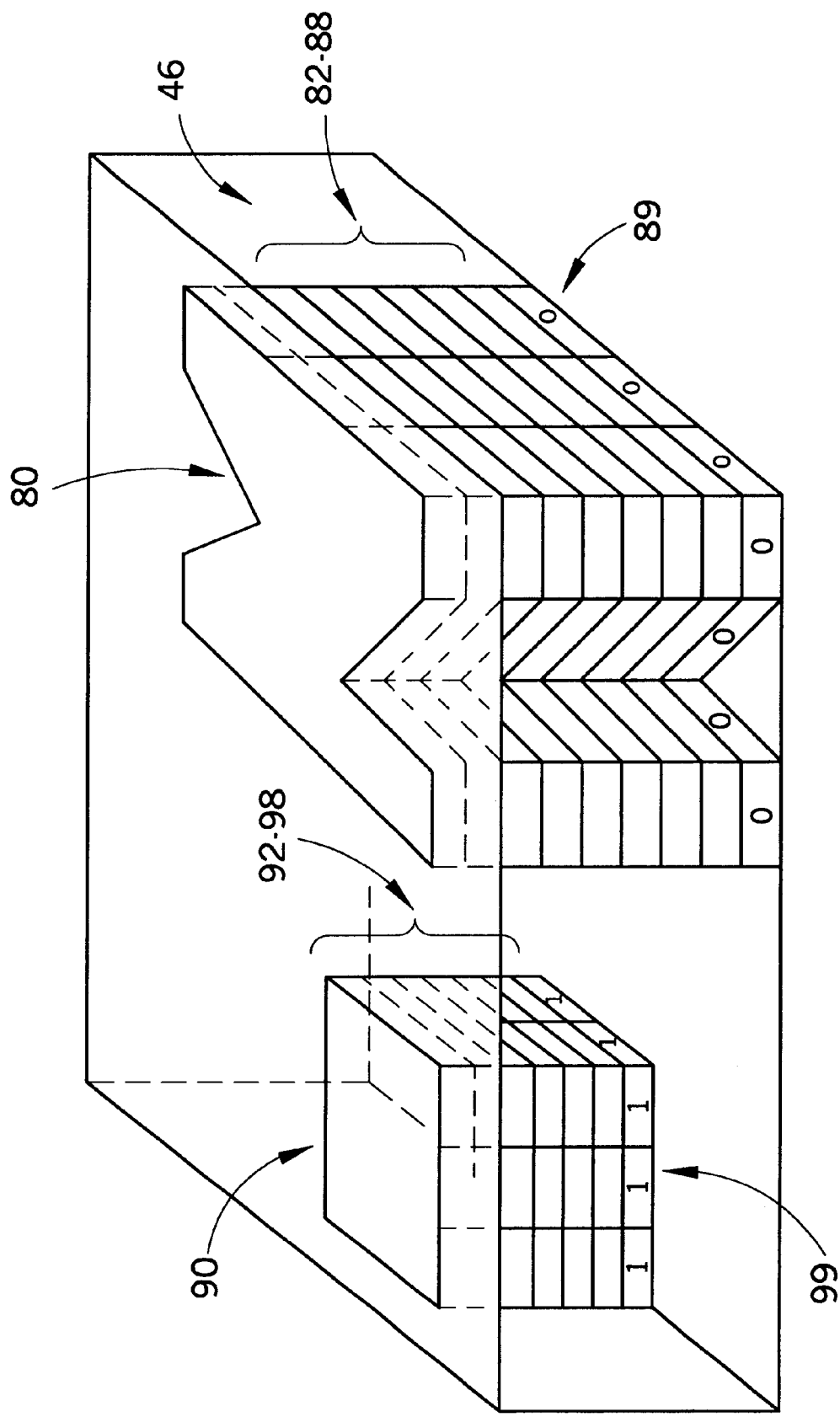
FIG. 3 is a schematic block diagram illustrating a pair of image objects rendered with object tags appended to frame buffer pixels in accordance with a first preferred embodiment of the invention.

As an example, FIG. 3 illustrates an X-shaped graphic image object 80 rendered into the yellow channel 46 of the grayscale frame buffer 36. The graphic image object was rendered subsequent to invocation of the first setcolortransfer operator (1) above. As can be seen, the seven (7) high order bits 82–88 hold the yellow color level value of the graphics object 80 while each of the lowest order bits 89, are reserved in accordance with the present invention for use as a pixel tag and, accordingly, are set to a value of "0" to indicate those pixels in the frame buffer that are associated with graphics-type objects, namely the X-shaped graphics object 80.

With continued reference to FIG. 3, a box-shaped non-graphic image object 90 is shown also rendered into the yellow channel 46 of the frame buffer 36. The box-shaped graphic image object was rendered immediately after invocation of the second setcolortransfer operator (2) above. As can be seen, the seven (7) high order bits 92–98 hold the yellow color level value of the box-shaped graphics object 90 while each of the lowest order bits 99 are used as a pixel tag and, accordingly, are set to a value of "1" to indicate those pixels in the frame buffer that are associated with non-graphics type objects, namely the box-shaped object 90.

By way of an example of expanding the above example of the first preferred embodiment, the following four (4) lines of interpretive programming language code, written in the preferred PostScript page description language, are used to set the yellow transfer function 64 within the color transform matrix 60 of the current graphics state 80 so that during object rendering, the least significant pair of pixel image bits in the yellow byte plane are set to "00", "01", "10" and "11" states, respectively, to represent the up to four (4) image object types. For example, the four states could be used as indicia to denote bitmap type objects, fill art type, line art, and text object types, respectively.

For bitmap object types:

$$\{\}\{\}\{255.0 \text{ mul cvi } 252 \text{ and } 0 \text{ or cvr } 255.0 \text{ div}\}\{\}\text{setcolortransfer} \quad (3)$$

For fill art object types:

$$\{\}\{\}\{255.0 \text{ mul cvi } 252 \text{ and } 1 \text{ or cvr } 255.0 \text{ div}\}\{\}\text{setcolortransfer} \quad (4)$$

For line art object types:

$$\{\}\{\}\{255.0 \text{ mul cvi } 252 \text{ and } 2 \text{ or cvr } 255.0 \text{ div}\}\{\}\text{setcolortransfer} \quad (5)$$

For text object types:

$$\{\}\{\}\{255.0 \text{ mul cvi } 252 \text{ and } 3 \text{ or cvr } 255.0 \text{ div}\}\{\}\text{setcolortransfer} \quad (6)$$

Figure 4:
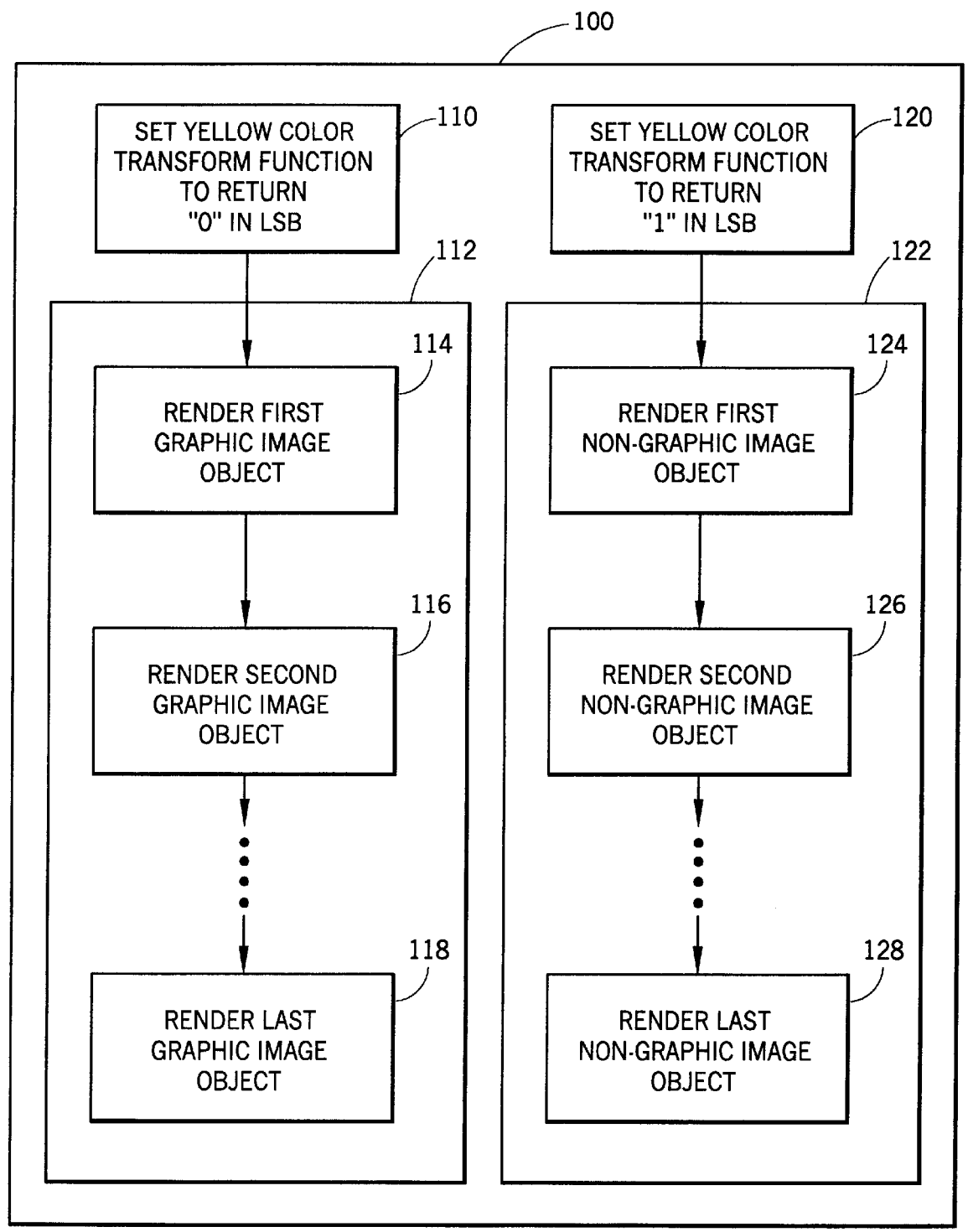
FIG. 4 shows a set of flow charts illustrating the preferred method of applying pixel tags to image data in accordance with the present invention; and, FIG. 5 is a block diagram illustrating a second preferred embodiment using an auxiliary specialized color transfer function to write the object characterization pixel tags into an auxiliary tag data channel or tag plane in the frame buffer of the imaging device.

Turning now to FIG. 4, the preferred method for applying pixel tags to image data in a digital imaging device using simple interpretative programming language commands according to the present invention will be described. As shown there, the preferred method 100 includes a pair of steps 110, 120 that each operate to set the yellow color transfer function procedure so that it generates least significant pixel tag bits in the gray scale frame buffer of a "0" when graphic image object type information is rendered and a "1" when non-graphics image object type information is rendered, respectively. Preferably, the step 110 that sets the yellow transfer function procedure to render bits that represent graphic image object type data is a simple interpretative programming language command of the preferred type set forth above at the first code section (1). Similarly, the step 120 that sets the yellow transfer function procedure to render bits that represent non-graphics image object type data is preferably implemented using the simple interpretative programming language command shown above at code section (2).

With continued reference to FIG. 4, after the programming language command of the code section (1) is executed at step 110 to set the yellow color transfer function, all of the graphic image objects that are rendered in turn at step 112 will include a least significant bit tag of "00" associated therewith. As shown, after the yellow color transfer function procedure is set to force a tag bit of "0" at step 110, a first graphic image object is rendered 114, followed by a second graphic image object at step 116, etc., until the last or final graphic image object is rendered at step 118.

Further with reference to FIG. 4, after the programming language command of the code section (2) is executed at step 120 to set the yellow color transfer function, all of the non-graphic image objects that are rendered in turn at step 222 will include a least significant bit tag of "1" associated therewith. As shown, after the yellow color transfer function procedure is set to force a tag bit of "1" at step 120, a first non-graphic image object is rendered 224, followed by a second non-graphic image object at step 226, etc., until the last or final non-graphic image object is rendered at step 228.

It is to be noted that although the preferred method for applying pixel tags to image data shown in the Figure illustrates a set of graphic image objects and a set of non-graphic image objects that are rendered separately and in succession, it is also possible, in accordance with the present invention, to render graphic and non-graphic image objects alternately. In that case, it is essential to execute the programming language command of the code section (1) at step 110 immediately before any of the graphic image objects are rendered. Likewise, it is essential to execute the programming language command of the code section (2) at step 120 immediately before any of the non-graphic image objects are rendered. Thus, by carefully executing the appropriate programming language commands of the code sections (1) or (2) immediately prior to the paint operators, graphic, as well as non-graphic image object types can be rendered with the appropriate per-pixel tags in any order or sequence.

Figure 5:
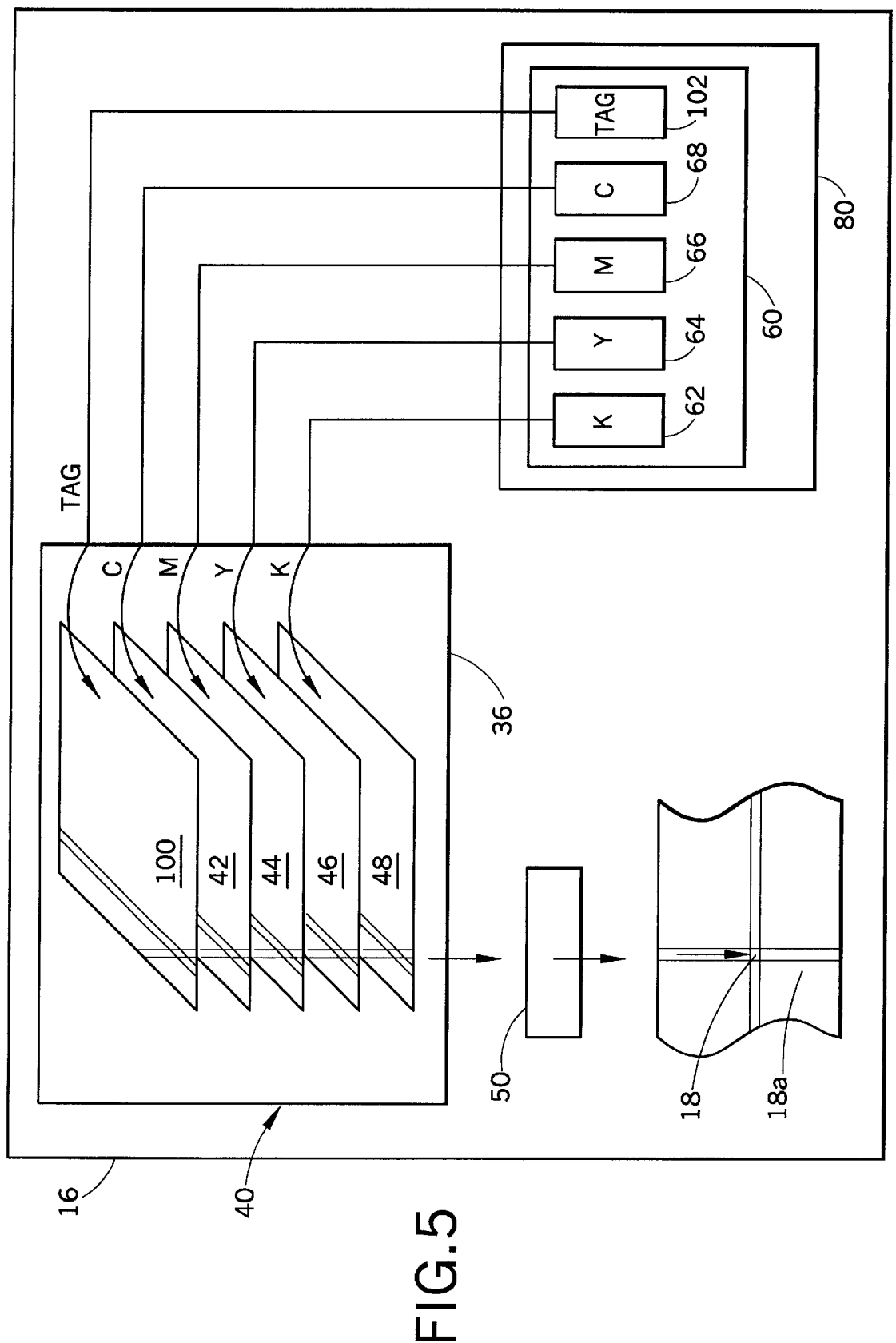

FIG. 5 illustrates a second preferred embodiment of the present invention wherein the cyan, magenta, yellow, and black byte planes 40–46 of the gray scale frame buffer 36 are supplemented with an auxiliary tag bit plane 100, as illustrated. In this embodiment, an auxiliary transfer function procedure 102 is also provided within the color transform matrix 60 of the current graphics state 70 for writing the appropriate tag data directly into the tag data byte plane 100 as illustrated.

When a graphic, bit map, fill art, line art or text object type is encountered by the image data processor 28 of the image generation device 16, the auxiliary color transfer function procedure 102 is operative to decode the object type of the image data and to write the decoded value into the tag bit plane 100. The tag bit plane 100 preferably has from one (1) to eight (8) or more tag bits associated with each pixel. Further, each of the pixel display values in the frame buffer 36 is associated with a single tag value in the tag plane 100. In that way, the print engine is enabled by the tag bit plane to render an image 18 based on information regarding the object type of the image data forming the pixel display values contained in the cyan, magenta, yellow, and black byte planes 40–46.

In accordance with the second embodiment of the invention, the auxiliary transfer function procedure 102 is preferably programmable to decode selectable image object types and to write the decoded information into a selectable number of tag bit(s) in the auxiliary tag bit plane 100.

The invention has been described with reference to the preferred embodiments. Obviously, modifications and alterations will occur to others upon a reading and understanding of this specification. It is intended to include all such modifications and alterations insofar as they come within the scope of the

Having thus described the invention, it is now claimed:

1. A method of labeling image object data in a digital imaging device on a per-pixel basis by a print engine of the imaging device, the method comprising the steps of receiving first page description language data into the digital imaging device;

executing the first page description language data in the digital imaging device to set a first transfer function procedure of a transform matrix to thereafter generate a first predetermined tag value in pixels of image objects when the image objects are rendered to a frame buffer by the transform matrix;

receiving, into the imaging device, first image object data to be rendered to the frame buffer, the first image object data being of a first image object type;

executing a first paint operator associated with the first image object data; and, rendering the first image object data using the transform matrix to generate a first set of pixel display values in the frame buffer of the imaging device representative of said first image object data, each of the first set of pixel display values containing at least one first identifier bit corresponding to said first predetermined tag value to relate the first image object data to the first image object type.

2. The method of labeling image object data according to claim 1 further comprising the steps of:

receiving, into the digital imaging device, second image object data to be rendered to the frame buffer, the second image object data being of said first image object type;

executing a second paint operator associated with the second image object data; and, rendering the second image object data using the transform matrix to generate a second set of pixel display values in the frame buffer of the imaging device representative of said second image object data, each of the second set of pixel display values containing at least one first identifier bit corresponding to said first predetermined tag value to relate the second image object data to said first image object type.

3. The method of labeling image object data according to claim 2 further comprising the steps of:

receiving second page description language data into the digital imaging device;

executing the second page description language data in the digital imaging device to set said first transfer function procedure of the transform matrix to thereafter generate a second predetermined tag value in pixels of image objects when the image objects are rendered to the frame buffer by the transform matrix;

receiving, into the imaging device, third image object data to be rendered to the frame buffer, the third image object data being of a second image object type;

executing a third paint operator associated with the third image object data; and, rendering the third image object data using the transform matrix to generate a third set of pixel display values in the frame buffer of the imaging device representative of said third image object data, each of the third set of pixel display values containing at least one first identifier bit corresponding to said second predetermined tag value to relate the third image object data to the second image object type.

4. The method of labeling image object data according to claim 3 further comprising the steps of:

receiving, into the digital imaging device, fourth image object data to be rendered to the frame buffer, the fourth image object data being of said second image object type;

executing a fourth paint operator associated with the fourth image object data; and, rendering the fourth image object data using the transform matrix to generate a fourth set of pixel display values in the frame buffer of the imaging device representative of said fourth image object data, each of the fourth set of pixel display values containing at least one first identifier bit corresponding to said second predetermined tag value to relate the fourth image object data to said second image object type.

5. The method of labeling image object data according to claim 4 wherein:

the step of executing the first page description language data includes executing a PostScript page description language line of code:
{}{}{255.0 mul cvi 254 and cvr 255.0 div}{}setcolortransfer; and, the step of executing the second page description language data includes executing a PostScript page description language line of code:
{}{}{255.0 mul cvi 01 or cvr 255.0 div}{} setcolortransfer.

6. The method of labeling image object data according to claim 2 further comprising the steps of:

receiving second page description language data into the digital imaging device, executing the second page description language data in the digital imaging device to set said first transfer function procedure of the transform matrix to thereafter generate a second predetermined tag value in pixels of image objects when the image objects are rendered to the frame buffer by the transform matrix;

receiving, into the imaging device, second image object data to be rendered to the frame buffer, the second image object data being of a second image object type;

executing a second paint operator associated with the second image object data; and, rendering the second image object data using the transform matrix to generate a second set of pixel display values in the frame buffer of the imaging device representative of said second image object data, each of the second set of pixel display values containing at least one first identifier bit corresponding to said second predetermined tag value to relate the second image object data to the second image object type.

7. The method of labeling image object data according to claim 6 wherein:

the step of executing the first page description language data includes executing a PostScript page description language line of code:
{}{}{255.0 mul cvi 252 and 0 or cvr 255.0 div}{}setcolortransfer;

the step of executing the second page description language data includes executing a PostScript page description language line of code:
{}{}({255.0 mul cvi 252 and 1 or cvr 255.0 div}{}setcolortransfer;

the step of executing the third page description language data includes executing a PostScript page description language line of code:
{}{}{255.0 mul cvi 252 and 2 or cvr 255.0 div}{}setcolortransfer; and, the step of executing the fourth page description language data includes executing a PostScript page description language line of code:
{}{}{255.0 mul cvi 252 and 3 or cvr 255.0 div}{}setcolortransfer.

8. In a digital imaging apparatus receiving page description language commands and page description language image object data describing a first image, a method of associating a tag value with corresponding portions of a digital representation of the first image comprising the step of:

in a transform matrix of the imaging device, generating a plurality of groups of digital pixel display values in a frame buffer of the imaging device for use by a print engine of the imaging device to generate a display of the first image, each of the plurality of groups of pixel display values generated by the transform matrix including tag information labeling each group of pixel display values as a one of a plurality of image object classifications.

9. The method according to claim 8 further comprising the step of providing an auxiliary transfer function procedure in said transform matrix, the auxiliary transfer function being adapted to exclusively generate tag bits into an auxiliary tag bit plane of the frame buffer when the page description language image object data is rendered by the transform matrix to the frame buffer.

10. The method according to claim 9 wherein the step of generating the plurality of groups digitized pixel display values includes generating, in said auxiliary transfer function procedure, tag information data labeling each said group of pixel display values as a one of said plurality of image object classification.

11. The method according to claim 10 wherein the step of providing the auxiliary transfer function procedure includes providing the auxiliary transfer function procedure in addition to a cyan color transfer function in the transform matrix, a magenta color transfer function in the transform matrix, a yellow color transfer function in the transform matrix, and a black color transfer function in the transform matrix.

12. A method of providing tagged image data in a frame buffer of a digital imaging device, the method comprising the steps of:

executing a first page description language command in the digital imaging device to set a first color transfer function of a color transform matrix so that the color transform matrix reacts to subsequent paint operators to render image data into the frame buffer with a first predetermined tag value associated therewith; and, executing a first paint operator using the color transform matrix to render first image data as a first group of pixel display values in the frame buffer, each of the first group of pixel display values having said first predetermined tag value associated therewith.

13. The method of providing tagged image data according to claim 12 wherein:

the step of executing the first page description language command includes setting the first color transfer function of the color transform matrix so that the color transform matrix reacts to subsequent paint operators to render said image data into the frame buffer with a first predetermined bit pattern associated therewith; and, the step of executing the first paint operator includes using the color transform matrix to render the first image data as a first group of pixel display values in the frame buffer, each of the first group of pixel display values having said first predetermined bit pattern associated therewith.

14. The method of providing tagged image data according to claim 12 further comprising the steps of:

executing a second page description language command in the digital imaging device to set said first color transfer function of the color transform matrix so that the color transform matrix reacts to subsequent paint operators to render said image data into the frame buffer with a second predetermined tag value associated therewith; and, executing a second paint operator using the color transform matrix to render the second image data as a second group of pixel display values in the frame buffer, each of the second group of pixel display values having said second predetermined tag value associated therewith.

15. The method of providing tagged image object data according to claim 14 wherein:

the step of executing the first page description language data includes executing a PostScript page description language line of code:

{}{}{255.0 mul cvi 254 and cvr 255.0 div}{}setcolortransfer, and, the step of executing the second page description language data includes executing a PostScript page description language line of code:

{}{}{255.0 mul cvi 01 or cvr 255.0 div)}{}setcolortransfer.

16. The method of tagging image data according to claim 14 further comprising the steps of:

executing a third page description language command in the digital imaging device to set said first color transfer function of the color transform matrix so that the color transform matrix reacts to subsequent paint operators to render said image data into the frame buffer with a third predetermined tag value associated therewith;

executing a third paint operator using the color transform matrix to render the third image data as a third group of pixel display values in the frame buffer each of the third group of pixel display values having said third predetermined tag value associated therewith; and, executing a fourth page description language command in the digital imaging device to set said first color transfer function of the color transform matrix so that the color transform matrix reacts to subsequent paint operators to render said image data into the frame buffer with a fourth predetermined tag value associated therewith;

executing a fourth paint operator using the color transform matrix to render the fourth image data as a fourth group of pixel display values in the frame buffer each of the fourth group of pixel display values having said fourth predetermined tag value associated therewith.

17. The method of providing tagged image object data according to claim 16 wherein:

the step of executing the first page description language data includes executing a PostScript page description language line of code:

{}{}{255.0 mul cvi 252 and 0 or cvr 255.0 div}{}setcolortransfer;

the step of executing the second page description language data includes executing a PostScript page description language line of code:

{}{}{255.0 mul cvi 252 and 1 or cvr 255.0 div}{}setcolortransfer;

the step of executing the third page description language data includes executing a PostScript page description language line of code:

{}{}{255.0 mul cvi 252 and 2 or cvr 255.0 div}{}setcolortransfer; and, the step of executing the fourth page description language data includes executing a PostScript page description language line of code:

{}{}{255.0 mul cvi 252 and 3 or cvr 255.0 div}{}setcolortransfer.

* * * * *